United States Patent Office 2,833,815
Patented May 6, 1958

---

2,833,815

TREATMENT OF NAPHTHENIC ACIDS

Stanford J. Hetzel, Cheltenham, Pa., assignor to Sun Oil Company, Philadelphia, Pa., a corporation of New Jersey No Drawing. Application September 28, 1954
Serial No. 458,974

4 Claims. (Cl. 260—514)

This invention relates to the treatment of naphthenic acids to improve the properties thereof. More particularly, this invention relates to improving naphthenic acid refining procedures which involve formaldehyde condensation treatment.

Naphthenic acids are recovered from mineral oil in accordance with procedures known to those skilled in the art of petroleum refining. In general, such acids have very dark color initially, or turn very dark after being stored for a short time, and have high bromine number. A light, stable color and a low bromine number are important and desirable properties of naphthenic acids in many applications, and accordingly, methods have been proposed in the prior art for treating naphthenic acids to improve these properties.

One such prior art treatment comprises contacting naphthenic acids in liquid phase at reactive conditions with formaldehyde or a compound capable of liberating formaldehyde at the contact conditions such as paraformaldehyde, in the presence of a condensation catalyst such as sulfuric acid. A disadvantage of this treatment, however, is that a substantially insoluble, semi-solid sludge is formed from which the refined naphthenic acids must be separated. This sludge readily agglomerates into an insoluble mass and settles to the bottom of the reaction vessel where it tends to hinder the operation of the stirring mechanism in the reactor. The refined naphthenic acids cannot be separated from this sludge in a continuous manner by filtration since within a short time the sludge effectively plugs the filter thus frequently necessitating expensive shut-down and cleaning operations. Nor can the sludge be effectively separated from the refined naphthenic acids either by decantation or by distillation. In decantation techniques, the viscous nature of the sludge prevents ready removal of such sludge, and results in a build-up of sludge in the decantation vessel. In addition, refined naphthenic acids are carried out of the decantation vessel and are lost with such sludge as can be separated in this manner. Separation by distillation is not feasible since the sludge decomposes at high temperatures causing decomposition products of poor odor and color to pass overhead with the distillate naphthenic acids and thus counteracting the beneficial effect of the foregoing refining procedures.

It is an object of this invention to provide a method whereby the sludge formed during formaldehyde contact treatment of naphthenic acids can be readily separated from the refined acids in a continuous manner. Other objects will be apparent hereinafter.

In accordance with this invention, agglomeration of the sludge which is formed during the formaldehyde condensation treatment of naphthenic acids is prevented and the sludge is rendered susceptible to continuous separation by filtration from the refined naphthenic acids by adsorbing the sludge on an added granular adsorbent prior to such filtration. I have discovered that this adsorption of the sludge results in the sludge being dispersed into particles which have greatly lessened adhesive and agglomerative properties and which, therefore, can be separated by filtration with correspondingly reduced difficulty.

Any of the commercially available solid adsorbents such as acid treated clay, silica gel, activated carbon, fuller's earth, bauxite, activated alumina, diatomaceous earth, and the like, can be successfully used in practicing this invention. These adsorbents are not necessarily equally desirable for use both from an economic standpoint as well as from the standpoint of sludge dispersing ability, but all can successfully be used in this invention.

In practicing the invention, it is preferred to add a portion or all of the adsorbent to the naphthenic acids prior to the condensation reaction with formaldehyde. By this procedure, the sludge formed during the ensuing condensation reaction is adsorbed and dispersed by the adsorbent as rapidly as it is formed. Thus there is as little opportunity as possible for the sludge to agglomerate and plug or incapacitate any portion of the reaction or subsequent treating vessels. It is also within the scope of the invention, however, to add a portion or all of the adsorbent to the mixture resulting from the formaldehyde treatment.

It is preferred to dilute the mixture with an inert hydrocarbon of lower boiling range prior to filtration since such dilution lessens sludge solubility in the treated acids, and aids the filtration by lessening the viscosity of the filtrate. Suitable diluents comprise normally liquid saturate or aromatic hydrocarbons such as pentane, hexane, heptane, octane, benzene, toluene, xylenes, ethylbenzene, and the like, or liquid saturate or aromatic petroleum fractions of lower boiling range. The diluent is readily separated from the filtrate by distillation. Additionally portions of the diluent are advantageously used to wash the filter cake to insure complete removal therefrom of the refined naphthenic acids.

The amount of adsorbent which must be used for best results varies depending upon the degree of refinement of the naphthenic acids so-treated and upon the severity of the formaldehyde treatment. Sufficient adsorbent should be added to disperse a predominance and preferably all of the sludge which is formed during the refining procedure. When treating naphthenic acids of a lesser degree of prior refinement, the formaldehyde treatment may result in the formation of sludge comprising 20% or more of the charge, while when treating highly refined naphthenic acids, only about 5% of sludge may be formed. Normally the addition of adsorbent in amount of about 2% to 30% of the charge is sufficient to disperse the sludge so that the refined naphthenic acids may readily be separated by filtration. The treatments which result in the formation of larger quantities of sludge, require greater amounts of adsorbent for successful practice of this invention.

The following example illustrates the invention:

Crude deoiled naphthenic acids having a saponification number of 145 mg. of KOH per gram and a bromine number of 10.5 were subjected to treatment with 2% by weight each of paraformaldehyde and $H_2SO_4$ at a temperature of about 250° F. Prior to such treatment 5% of an adsorptive clay known commercially as Superfiltrol No. X-417 was added to the naphthenic acids.

At the completion of the condensation reaction the resulting mixture was removed from the reaction vessel and, after the addition of an additional 15% of Superfiltrol, the mixture was filtered. No filtration problems were encountered, and about 67% of the charge was recovered in the filtrate. The filter cake was washed with iso-octane and an additional 22.8% of the charge naphthenic acids were recovered. After removal of the iso-octane these naphthenic acids were combined with the filtrate and the resulting mixture was distilled. A 50% distillate naphthenic acid fraction having a saponification number of 190 mg. of KOH per gram, a bromine number of 3.8 and an O. D. color of 7.5 was obtained.

In an experiment similar to that described above, no adsorbent was used. It was substantially impossible to effect separation of a predominance of the refined naphthenic acids from the sludge by filtration due to continual plugging of the filter by the sludge.

I claim:

1. In a process for refining petroleum naphthenic acids wherein naphthenic acids, in liquid phase, are reacted with formaldehyde in the presence of a condensation catalyst to form a substantially insoluble, semi-solid sludge, the improvement which comprises contacting a granular solid adsorbent with said sludge whereby the sludge is dispersed by adsorption on said adsorbent, and separating naphthenic acids from the solid adsorbent containing adsorbed sludge.

2. In a process for refining petroleum naphthenic acids wherein the naphthenic acids, in liquid phase, are reacted with formaldehyde in the presence of a condensation catalyst to form a substantially insoluble semi-solid sludge, the improvement which comprises reacting naphthenic acids with formaldehyde in the presence of a granular solid adsorbent whereby the sludge formed during the reaction is dispersed by adsorption on said solid adsorbent, filtering the resulting mixture after the reaction to separate naphthenic acids from the solid adsorbent containing adsorbed sludge.

3. Process according to claim 1 wherein an inert hydrocarbon diluent, having a lower boiling range than the naphthenic acids, is added to the mixture of treated naphthenic acids and solid adsorbent containing adsorbed sludge prior to said separation of naphthenic acids.

4. Process according to claim 1 wherein said granular solid adsorbent is acid-activated clay.

References Cited in the file of this patent

UNITED STATES PATENTS

| | | |
|---|---|---|
| 1,901,240 | Henriksen | Mar. 14, 1933 |
| 1,933,868 | Mitchell-Roberts | Nov. 7, 1933 |
| 1,989,028 | Smith | Jan. 22, 1935 |
| 2,133,765 | Ewing | Oct. 18, 1938 |
| 2,301,528 | Ewing | Nov. 10, 1942 |

FOREIGN PATENTS

| | | |
|---|---|---|
| 390,847 | Germany | Feb. 23, 1924 |